Oct. 4, 1949.   J. E. BURNETT   2,483,621
TIE ROD SAFETY ATTACHMENT
Filed March 16, 1948
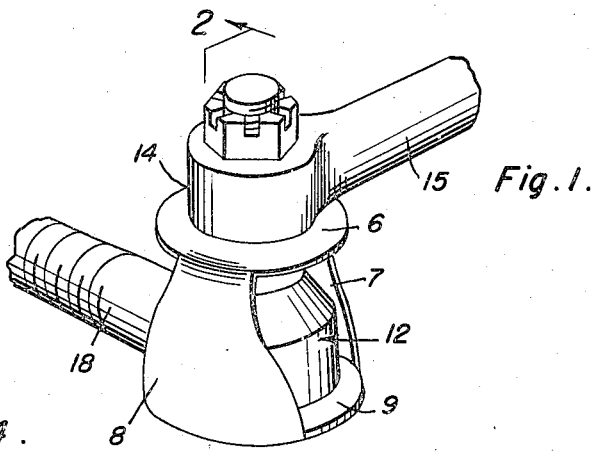
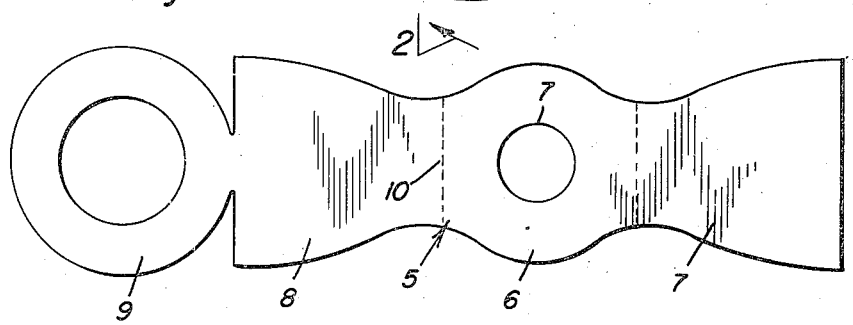
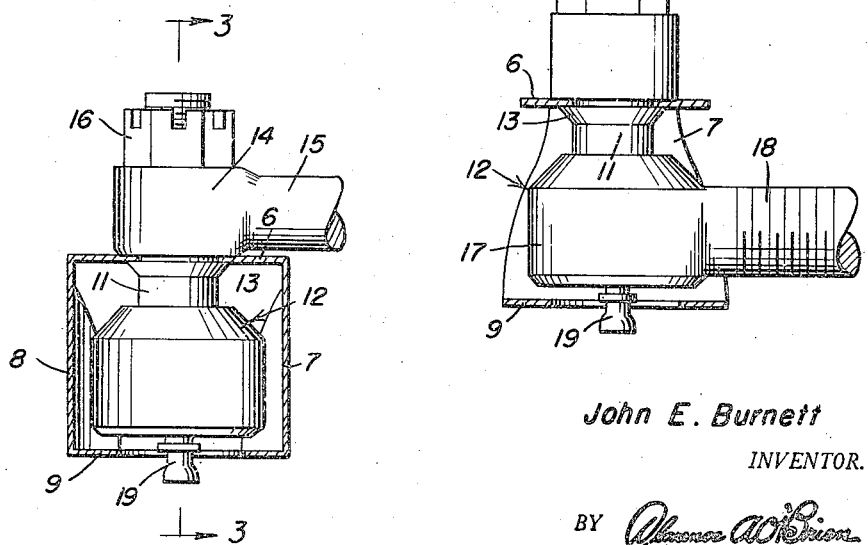
John E. Burnett
INVENTOR.

Patented Oct. 4, 1949

2,483,621

UNITED STATES PATENT OFFICE 2,483,621

TIE ROD SAFETY ATTACHMENT

John E. Burnett, Drumright, Okla., assignor of one-fourth to Kermit E. Nash, Drumright, Okla.

Application March 16, 1948, Serial No. 15,221

3 Claims. (Cl. 287—90)

The present invention relates to new and useful improvements in tie rods for the steering mechanism of motor vehicles and more particularly to a safety attachment to prevent the tie rod from separating or falling off should the ball and socket joint thereof become worn and thereby avoid the sudden loss of steering control of the vehicle.

An important object of the invention is to provide an attachment of this character which may be easily and quickly placed in position at the ball and socket joint of the tie rod to hold the parts in assembled relation should the usual ball and socket joint of the tie rod become worn to an extent to prevent safe driving of the vehicle and which at the same time is inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a tie rod showing the safety attachment in position at the ball and socket joint thereof.

Figure 2 is a vertical sectional view taken substantially on a line 2—2 of Figure 1.

Figure 3 is a vertical sectional view taken substantially on a line 3—3 of Figure 2, and Figure 4 is a plan view of the blank metal body from which the safety attachment is constructed.

Referring now to the drawing in detail wherein for the purpose of illustration I have disclosed a preferred embodiment of the invention the numeral 5 designates a flat sheet metal blank of elongated form and including a central annular portion 6 having an opening 7 therein and end portions 7 and 8. A ring 9 is formed as an integral extension with the end edge of the end portion 8 of the blank.

The end portions 7 and 8 are folded at right angles to the central portion 6 along the transverse fold lines indicated at 10 and the stem portion indicated at 11 of a ball and socket joint designated generally at 12 is inserted through the opening 7 of the central portion 6 so that the central portion rests on a flange 13 formed as a part of stem 11. The eye 14 of a rod 15 forming part of the usual steering mechanism of a vehicle is secured in position on the stem 11 on top of the central portion 6 by a nut 16 threaded on the upper end of the stem.

The end portions 7 and 8 bent downwardly from the opposite side edges of the central portion 6 are positioned at diametrically opposite sides of the ball and socket joint 12 and the ring member 9 is bent at its junction with the end portion 8 under the ball and socket joint 12 and the free edge of the ring portion 9 welded or otherwise suitably secured to the free edge of end portion 7 to thus hold the socket portions 17 of the ball and socket joint against dropping downwardly from the lower end of stem 11 should the parts become worn or broken.

The socket portion 17 of the ball and socket joint is formed at one end of the usual tie rod 18.

The grease fitting 19 at the bottom of the ball and socket joint extends downwardly through the opening in ring 9 in a position for convenient access to lubricate the ball and socket joint.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A safety attachment for ball and socket joints comprising a cage anchored to one part of a ball and socket joint and receiving the other part of said joint to hold the parts against separating movement, said cage being constructed of a metal blank bent to provide a top, bottom and opposed sides permanently united to each other.

2. A safety attachment for ball and socket joints comprising a cage anchored to one part of a ball and socket joint and receiving the other part of said joint to hold the parts against separating movement, said cage including a top, bottom and a pair of opposed sides, said bottom being integrally formed with one of the sides and secured at its free edge to the other of the sides.

3. A safety attachment for ball and socket joints comprising a cage anchored to one part of a ball and socket joint and receiving the other part of said joint to hold the parts against separating movement, said cage including an annular top and an annular bottom, and a pair of opposed sides connecting the top and bottom, said sides being curved to substantially enclose the ball and socket joint.

JOHN E. BURNETT.

REFERENCES CITED

The following references are of record in the file of this patent:

UNITED STATES PATENTS

| Number | Name | Date |
| --- | --- | --- |
| 2,187,915 | Ruffo | Jan. 23, 1940 |
| 2,208,325 | Krutsch | July 16, 1940 |
| 2,444,658 | Lucas | July 6, 1948 |